United States Patent
Noiman et al.

(10) Patent No.: US 10,969,996 B1
(45) Date of Patent: Apr. 6, 2021

(54) EXTENDABLE HARDWARE QUEUE STRUCTURE AND METHOD OF OPERATION THEREOF

(71) Applicant: Marvell Israel (M.I.S.L) Ltd., Yokne'am (IL)

(72) Inventors: Moran Noiman, Kiriyat Ono (IL); Michael Weiner, Nes Ziona (IL); Eliya Babitsky, Caesarea (IL)

(73) Assignee: Marvell Israel (M.I.S.L) Ltd., Yokne'am (IL)

( * ) Notice: Subject to any disclaimer, the term of this patent is extended or adjusted under 35 U.S.C. 154(b) by 0 days.

(21) Appl. No.: 15/929,206

(22) Filed: Jan. 23, 2020

Related U.S. Application Data (60) Provisional application No. 62/802,113, filed on Feb. 6, 2019.

(51) Int. Cl.
*G06F 13/00* (2006.01)
*G06F 3/06* (2006.01)

(52) U.S. Cl.
CPC ............ *G06F 3/0659* (2013.01); *G06F 3/061* (2013.01); *G06F 3/0653* (2013.01); *G06F 3/0673* (2013.01)

(58) Field of Classification Search
CPC .... G06F 3/0659; G06F 3/0673; G06F 3/0653; G06F 3/061
See application file for complete search history.

(56) References Cited

U.S. PATENT DOCUMENTS

| | | | |
|---|---|---|---|
| 8,819,312 B2 | 8/2014 | Shumsky et al. | |
| 9,459,829 B2 | 10/2016 | Shumsky et al. | |
| 10,193,831 B2 | 1/2019 | Peled et al. | |
| 2008/0247409 A1* | 10/2008 | Choudhury | H04L 49/90 370/412 |
| 2013/0070584 A1* | 3/2013 | Hutchison | G06F 11/3058 370/216 |
| 2014/0139537 A1* | 5/2014 | Ghosh | G09G 5/02 345/547 |

FOREIGN PATENT DOCUMENTS

CN 101499956 B * 10/2012

* cited by examiner

*Primary Examiner* — Jing-Yih Shyu (57) ABSTRACT

A hardware queue for an integrated circuit device includes an internal queue memory and at least one external queue memory. The internal queue memory and the external queue memory are operated as a continuous hardware queue memory by monitoring occupancy of the internal queue memory and, based on that occupancy, controlling an internal tail pointer indicating a next write point for inserting new data into the internal queue memory, an internal head pointer indicating a next read point for extracting data from the internal queue memory based on order of insertion, at least one external tail pointer indicating a next write point for inserting new data into the external queue memory, at least one external head pointer indicating a next read point for extracting data from the external queue memory based on order of insertion, and wrap pointers indicating transitions between the internal queue memory and the external queue memory.

24 Claims, 5 Drawing Sheets

EXTENDABLE HARDWARE QUEUE STRUCTURE AND METHOD OF OPERATION THEREOF

CROSS REFERENCE TO RELATED APPLICATION

This disclosure claims the benefit of commonly-assigned U.S. Provisional Patent Application No. 62/802,113, filed Feb. 6, 2019, which is hereby incorporated by reference herein in its entirety.

FIELD OF USE

This disclosure relates to a memory queue structure and its operation. More particularly, this disclosure relates to an extendable hardware queue having an internal queue memory and at least one external queue memory.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Many integrated circuit devices include hardware memory queues, commonly referred to simply as "queues", which may be used, e.g., for synchronizing logical functions to resolve issues such as, for example, rate-matching, time-synchronization, and ordering.

Hardware queues frequently operate according to a First-In/First-Out (FIFO) scheme according to which data elements are removed from the queue in the order in which they are inserted, regardless to the timing of enqueue and dequeue events. Control logic maintains pointers to the storage location to which the next data element should be written, and to the storage location from which next (i.e., oldest) data element should be read. The former pointer may be referred to as the write pointer, or the "tail pointer," while the latter pointer may be referred to as the read pointer, or the "head pointer."

Some devices include, in addition to an onboard hardware queue, an interface to an off-device memory that can serve as an additional, or overflow, queue memory, to be used when the onboard hardware queue is full. Such an external queue memory is commonly implemented using a different memory technology than the onboard queue memory, and may be less expensive, on a per-bit basis, than the onboard queue memory. The external queue memory also may be slower than the onboard queue memory. Even if the external queue memory is not slower than the onboard queue memory, the external queue memory is further away. Therefore, use of an external queue memory increases latency.

SUMMARY

A method according to implementations of the subject matter of this disclosure for operating a hardware queue for an integrated circuit device, where the hardware queue includes an internal queue memory onboard the integrated circuit device and having a number of storage locations, and at least one external queue memory outside the integrated circuit device, includes monitoring occupancy of the internal queue memory, and responsive to occupancy of the internal queue memory, controlling:

(a) an internal tail pointer indicating a next write point for inserting new data into the internal queue memory, (b) an internal head pointer indicating a next read point for extracting data from the internal queue memory based on order of insertion, (c) at least one external tail pointer indicating a next write point for inserting new data into the external queue memory, (d) at least one external head pointer indicating a next read point for extracting data from the external queue memory based on order of insertion, and (e) wrap pointers indicating transitions between the internal queue memory and the external queue memory, to operate the internal queue memory and the external queue memory as a continuous hardware queue memory.

In a first implementation of such a method, the controlling may include maintaining the internal tail pointer indicating a next write point for inserting new data into the internal queue memory, the internal tail pointer advancing through the internal queue memory, and maintaining the internal head pointer indicating a next read point for extracting data from the internal queue memory based on order of insertion, the internal head pointer advancing through the internal queue memory. When the internal tail pointer is active at a first storage location in the internal queue memory and the occupancy of the internal queue memory exceeds a first threshold, the controlling may further include setting a first internal wrap pointer at the first storage location in the internal queue memory to communicate to the internal head pointer to point to the at least one external queue memory upon reaching the first storage location, and activating a first external tail pointer in the at least one external queue memory. When the first external tail pointer is active at a second storage location in the at least one external queue memory, and the occupancy of the internal queue memory falls to or below a second threshold, the controlling may further include setting a first external wrap pointer at the second storage location in the external queue memory to communicate to a first external head pointer to point to the internal wrap pointer in the internal queue memory upon reaching the second storage location, and activating the internal tail pointer at the first storage location.

In a first variant of that first implementation, the monitoring the occupancy of the internal queue memory may include continually monitoring the occupancy of the internal queue memory.

In a second variant of that first implementation, the second threshold, at which the setting the first external wrap pointer and the activating the internal tail pointer are performed, may be equal to the first threshold, at which the setting the first internal wrap pointer and the activating the first external tail pointer are performed.

In a third variant of that first implementation, the second threshold, at which the setting the first external wrap pointer and the activating the internal tail pointer are performed, may be less than the first threshold, at which the setting the first internal wrap pointer and the activating the first external tail pointer are performed.

In a fourth variant of that first implementation, the first threshold, at which the setting the first internal wrap pointer and the activating the first external tail pointer are performed, may be 100% occupancy.

In a fifth variant of that first implementation, the second threshold, at which the setting the first external wrap pointer and the activating the internal tail pointer are performed, may be 0% occupancy.

In a sixth variant of that first implementation, when the at least one external queue memory outside the integrated circuit device includes a first external queue memory and a second external queue memory, the activating a first external tail pointer in the at least one external queue memory may include determining that one of the first external queue memory and the second external queue memory is empty, and activating the first external wrap pointer in the one of the first external queue memory and the second external queue memory that is empty.

That sixth variant of the first implementation may further include, when one of the first and second external queue memories was not empty, maintaining a second external wrap pointer in the one of the first and second external queue memories that was not empty, maintaining a second internal wrap pointer at a position, in the internal queue memory, where the first internal tail pointer was located when data had previously begun to be written to the one of the first and second external queue memories that was not empty, and when reading from the one of the first and second external queue memories that was not empty, returning the head pointer to the position, in the internal queue memory, of the second internal wrap pointer.

A seventh variant of that first implementation may further include after activating the tail pointer at the first storage location in the internal queue memory, advancing the tail pointer through the internal queue memory while maintaining the internal wrap pointer at the first storage location at least until the head pointer returns to the first storage location from the at least one external queue memory.

That seventh variant of the first implementation may further include continuing to advance the head pointer in the at least one external queue memory as data is read, until the head pointer reaches the first external wrap pointer, and upon the head pointer reaching the first external wrap pointer, returning the head pointer to the first storage location in the internal queue memory as indicated by the first internal wrap pointer.

An eighth variant of the first implementation may further include, after writing data at the next write point indicated by the internal tail pointer, advancing the tail pointer by one storage location in the internal queue memory, wherein advancing one storage location from a last storage location in the internal queue memory comprises advancing to a first storage location in the internal queue memory.

Memory queue apparatus according to implementations of the subject matter of this disclosure includes an integrated circuit device, a hardware queue including an internal queue memory onboard the integrated circuit device and having a number of storage locations, and at least one external queue memory outside the integrated circuit device, and a queue memory controller configured to monitor occupancy of the internal queue memory, and responsive to occupancy of the internal queue memory, control:
  (a) an internal tail pointer indicating a next write point for inserting new data into the internal queue memory,
  (b) an internal head pointer indicating a next read point for extracting data from the internal queue memory based on order of insertion,
  (c) at least one external tail pointer indicating a next write point for inserting new data into the external queue memory,
  (d) at least one external head pointer indicating a next read point for extracting data from the external queue memory based on order of insertion, and
  (e) wrap pointers indicating transitions between the internal queue memory and the external queue memory, to operate the internal queue memory and the external queue memory as a continuous hardware queue memory.

In a first implementation of such memory queue apparatus, the queue memory controller may be configured to maintain the internal tail pointer indicating a next write point for inserting new data into the internal queue memory, and maintain the internal head pointer indicating a next read point for extracting data from the internal queue memory based on order of insertion. When the internal tail pointer is active at a first storage location in the internal queue memory and the occupancy of the internal queue memory exceeds a first threshold, the queue memory controller may be configured to set a first internal wrap pointer at the first storage location in the internal queue memory to communicate to the internal head pointer to point to the at least one external queue memory upon reaching the first storage location, and activate a first external tail pointer in the at least one external queue memory. When the first external tail pointer is active at a second storage location in the at least one external queue memory, and the occupancy of the internal queue memory falls to or below a second threshold, the queue memory controller may be configured to set a first external wrap pointer at the second storage location in the external queue memory to communicate to a first external head pointer to point to the internal wrap pointer in the internal queue memory upon reaching the second storage location, and activate the internal tail pointer at the first storage location.

In a first variant of that first implementation, the controller may continually monitor the occupancy of the internal queue memory.

In a second variant of that first implementation, the second threshold, at which the queue memory controller is configured to set the first external wrap pointer and activating the internal tail pointer, may be equal to the first threshold, at which the queue memory controller is configured to set the first internal wrap pointer and activate the first external tail pointer.

In a third variant of that first implementation, the second threshold, at which the queue memory controller is configured to set the first external wrap pointer and activate the internal tail pointer, may be less than the first threshold, at which the queue memory controller is configured to set the first internal wrap pointer and activate the first external tail pointer.

In a fourth variant of that first implementation, the first threshold, at which the queue memory controller is configured to set the first internal wrap pointer and activate the first external tail pointer, may be 100% occupancy.

In a fifth variant of that first implementation, the second threshold, at which the queue memory controller is configured to set the first external wrap pointer and activate the internal tail pointer may be 0% occupancy.

In a sixth variant of that first implementation, when the at least one external queue memory outside the integrated circuit device includes a first external queue memory and a second external queue memory, the queue memory controller may activates a first external tail pointer in the at least one external queue memory by determining that one of the first external queue memory and the second external queue memory is empty, and activating the first external wrap pointer in the one of the first external queue memory and the second external queue memory that is empty.

In that sixth variant of the first implementation, when one of the first and second external queue memories was not empty, the queue memory controller may maintain a second external wrap pointer in the one of the first and second external queue memories that was not empty, and may maintain a second internal wrap pointer at a position, in the internal queue memory, where the first internal tail pointer was located when data had previously begun to be written to the one of the first and second external queue memories that was not empty, and when reading from the one of the first and second external queue memories that was not empty, may return the head pointer to the position, in the internal queue memory, of the second internal wrap pointer.

In a seventh variant of that first implementation, after activating the tail pointer at the first storage location in the internal queue memory, the queue memory controller may advances the tail pointer through the internal queue memory while maintaining the internal wrap pointer at the first storage location at least until the head pointer returns to the first storage location from the at least one external queue memory.

In that seventh variant of the first implementation, the queue memory controller may continue to advance the head pointer in the at least one external queue memory as data is read, until the head pointer reaches the first external wrap pointer, and upon the head pointer reaching the first external wrap pointer, may return the head pointer to the first storage location in the internal queue memory as indicated by the first internal wrap pointer.

In an eighth variant of that first implementation, after writing data at the next write point indicated by the internal tail pointer, the queue memory controller may advance the tail pointer by one storage location in the internal queue memory, wherein advancing one storage location from a last storage location in the internal queue memory includes advancing to a first storage location in the internal queue memory.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, use of an external queue memory increases latency. However, if an onboard queue memory becomes full, that also negatively impacts system performance. But making the onboard queue memory larger also has potentially negative consequences, including increasing cost. And making the onboard queue memory large enough for the greatest possible occupancy could lead to underutilization of hardware most of the time, which also has a cost.

In the end, there is a tradeoff in determining how large to make the onboard queue memory. The onboard queue memory should be large enough that in most cases it is not too small—i.e., it does not get full more often than some predetermined fraction of the time—but not so large that it frequently is underutilized by a large amount.

The sizing choice for the internal or onboard queue memory can be made easier by providing an external queue memory. The internal queue memory can be made large enough to handle most cases, while the external queue memory provides overflow space in cases where the internal queue memory does become full.

However, the external queue memory frequently uses a different memory technology than does the internal queue memory. In particular, while the internal queue memory in one example may be relatively fast, but relatively expensive, static random access memory (SRAM), the external queue memory in that example may be relatively slow, but relatively less expensive, dynamic random access memory (DRAM). Therefore, to maximize performance, implementations of the subject matter of this disclosure manage the transitions between the internal queue memory and the external queue memory to balance performance as occupancy of the internal queue memory fluctuates.

In any FIFO queue memory, the head pointer "chases" the tail pointer. That is, as the queue memory is filled, the tail pointer advances within the queue memory. By definition, because the earliest data to be written is read first, the head pointer will be following behind the tail pointer. If the tail pointer returns from the internal queue memory to the external queue memory because the internal queue memory has become too full, the head pointer needs to know to follow the tail pointer to the external queue memory. Similarly, if the tail pointer moves from the external queue memory to the internal queue memory because space had freed up in the internal queue memory (as data is read out), the head pointer needs to know to follow the tail pointer back to the internal queue memory.

Moreover, the rates of reading (dequeuing events) and writing (enqueuing events) are asynchronous. That is, the reading of old data from the queue memory does not occur at the same rate as the writing of new data into the queue memory. Insofar as reading and writing depend on when user applications request or send data, reading may occur faster than writing or slower than writing, depending on circumstances. Therefore, the head pointer does not necessarily follow the tail pointer at a fixed distance.

In accordance with implementations of the subject matter of this disclosure, a memory queue apparatus of an integrated circuit device includes an internal queue memory and at least one external queue memory. As long as occupancy of the internal queue memory remains below a first threshold, the internal queue memory operates as a circular buffer. The tail pointer advances through the internal queue memory, and when it reaches the last position in the internal queue memory and data is written to that position, the tail pointer wraps back to the first position of the internal queue memory and additional data is written to that position and subsequent positions. The first position and subsequent positions will be empty to receive data because, in the example, occupancy of the internal queue memory has remained below the aforementioned first threshold. Thus, the reading of data has occurred at least as fast as the writing of data, and the oldest data, in the first and subsequent positions of the internal queue memory, has been read out, vacating the first and subsequent positions. In such a situation, the memory queue remains completely within the internal queue memory, operating as a circular buffer. It should be noted, however, that while the internal queue memory may be implemented as a circular buffer, with pointers advancing from one position to the next and wrapping from a last position back to a first position, the internal queue memory also may be implemented instead as a linked list of memory locations in no particular order that logically operates as though it were a circular buffer.

In other situations, writing may occur faster than reading. In such situations, the internal queue memory will exceed the first threshold—i.e., will become full, such that there is no more room to write data into the memory queue, or may exceed some other predetermined fractional occupancy less than total occupancy. In that case, further writing to the memory queue may be to an external queue memory outside the integrated circuit device. When occupancy falls sufficiently as discussed below, writing resumes to the internal queue memory.

In accordance with implementations of the subject matter of this disclosure, in such situations, pointers are operated to manage the transitions between the internal queue memory and the external queue memory for seamless operation of the memory queue.

Before discussing pointer management in accordance with implementations of the subject matter of this disclosure, a discussion of occupancy thresholds is in order. It is desirable to remain in the faster, closer internal queue memory as long as possible. Therefore, the aforementioned threshold in some implementations is 100% occupancy. That is, if data is being written to the internal queue memory, data continues to be written to the internal queue memory as long as possible. On the other hand, once data is being written to the external queue memory, various considerations apply to a decision to return to the internal queue memory. In some implementations, writing of the data to the internal queue memory is resumed as soon as occupancy of the internal queue memory falls below the first threshold by even one data position. However, the next write operation may fill the internal queue memory again, particularly if writing occurs faster than reading, resulting in a quick shift again to the external queue memory, and subsequent bouncing back and forth between the internal queue memory and the external queue memory.

Thus, in other implementations, writing of the data to the internal queue memory is not resumed until occupancy of the internal queue memory falls to a second occupancy threshold below the first occupancy threshold. The second occupancy threshold could be some predetermined fraction of the first occupancy threshold—e.g., 50%, 75% or 90%. The smaller the fraction, the more time queue operations will remain in the slower, more remote external queue memory, but the less inefficient bouncing back and forth will occur.

In one extreme example, the first occupancy threshold is 100% and the second occupancy threshold is 0%. In other words, in that example, writing of data remains in the internal queue memory until the internal queue memory is completely full, at which point writing of data moves to the external queue memory, and writing continues in the external queue memory and does not return to the internal queue memory until the internal queue memory is empty.

The decision of how low to make the second occupancy threshold may depend on the expected relative reading and writing rates. In a case where reading is expected to happen at about the same rate, or faster, than writing, the second occupancy threshold can be relatively high, meaning that writing returns to the internal queue memory relatively quickly. But in a case where reading is expected to happen at a much lower rate than writing, the second occupancy threshold may be relatively low, because there is no point returning to the internal queue memory if the internal queue memory is going to become full again relatively quickly.

By definition, when writing returns to the internal queue memory, data will remain in the external queue memory to be read. In some cases, when writing returns to the internal queue memory based on a relatively high threshold, if writing speeds up and reading slows down, the internal queue memory may become full again before all data is read from the external queue memory. Therefore, in some implementations of the subject matter of this disclosure, two external queue memories are provided. If the internal queue memory becomes full again before all data is read from the first external queue memory, data can be written to the second external queue memory rather than trying to manage the tail pointer to avoid overwriting the data remaining in the first external queue memory.

The external queue memories are sized so that in most, if not all, cases, one of the external queue memories is empty when the internal queue memory becomes full (or reaches the first threshold). In addition, there is no limit to the number of external queue memories. Indeed, although considered logically to be separate devices, all of the individual external queue memories may simply be partitions of a single larger external memory device.

Implementations of the subject matter of this disclosure control pointers to manage the transitions between the internal queue memory (which may be circular) and the external queue memory. Such implementations may include, in addition to the head pointer and tail pointer in the internal queue memory, a head pointer and tail pointer in each of at least one external queue memory. In addition, respective wrap pointers may be provided to indicate, to a respective head pointer, when the tail pointer has moved between the internal queue memory and a respective external queue memory (in either direction).

For example, in an implementation including a single external queue memory, as queue elements (QEs)—i.e., data—are written into the internal queue memory, the internal tail pointer will advance, with the internal head pointer following behind as read requests are made to the queue system. When occupancy of the internal queue memory reaches the aforementioned first threshold, additional queue elements are written to the external queue memory rather than the internal queue memory, and the tail pointer shifts to an external tail pointer which begins to advance through the external queue memory as queue elements are added. When the transition from the internal queue memory to the external queue memory occurs, an internal wrap pointer is left at the most recent location of the internal tail pointer in the internal queue memory.

The internal wrap pointer serves two functions. First, as the internal head pointer follows behind and eventually reaches the location from which the internal tail pointer transitioned to the external tail pointer, the presence of the internal wrap pointer signals to the internal head pointer to transition to the external queue memory, where an external head pointer starts following the external tail pointer.

Eventually, enough queue elements will be read out of the queue system that occupancy of the internal queue memory will fall below the aforementioned second threshold (the second threshold having been set as discussed above). When occupancy of the internal queue memory falls below the aforementioned second threshold, the tail pointer will transition back to the internal tail pointer, which is located in the internal queue memory, at the location from which the tail pointer previously transitioned to the external tail pointer, which also is the location of the internal wrap pointer. At this second transition, from the external queue memory back to the internal queue memory, the tail pointer will leave an external wrap pointer. Following this second transition, as more queue elements are written to the queue system, the internal tail pointer will begin to advance away from the internal wrap pointer, but the internal wrap pointer will remain in place. As the external head pointer advances through the queue elements that remain in the external queue memory, the external head pointer eventually will reach the location of the external wrap pointer. At that time, there will be a transition from the external head pointer back to the internal head pointer, which will start at the location of the internal wrap pointer.

Eventually, occupancy of the internal queue memory will again reach the first threshold. How long that takes after a transition of the tail pointer back from the external queue memory will depend on where the second threshold is set. And depending on the occupancy level of the external queue memory at the time of the transition of the tail pointer back from the external queue memory to the internal queue memory, and on the relative rates of reading and writing of queue elements to and from the queue system, there may still be queue elements in the external queue memory at a time when a new transition to the external queue memory is required.

Such a situation could be accommodated with a single external queue memory by having the tail pointer transition to the location of the external wrap pointer. However, such a solution can become complicated as multiple transitions give rise to multiple internal and external wrap pointers, depending on the thresholds and the relative reading and writing rates.

Therefore, in accordance with a second implementation of the subject matter of this disclosure, a second external queue memory is provided. If a transition from the internal queue memory to one of the external queue memories is required because the first threshold is met, and one of the external queue memories is occupied, the tail pointer transitions to that one of the external queue memories that is not occupied. If neither of the external queue memories is occupied (either at the first transition of the queue system out of the internal queue memory, or at some subsequent transition at a time when both external queue memories are empty), the tail pointer will transition to one of external queue memories that has been designated the first external queue memory. The tail pointer also will transition to that one of external queue memories that has been designated the first external queue memory if the first external queue memory is unoccupied while the other external queue memory, which may be designated as the second external queue memory, is occupied. On the other hand, the tail pointer will transition to that one of external queue memories that has been designated the second external queue memory if the second external queue memory is unoccupied while the first external queue memory is occupied.

In such an implementation, in addition to the internal tail pointer and the internal head pointer in the internal queue memory, there are a first external tail pointer and a first external head pointer in the first external queue memory, and a second external tail pointer and a second external head pointer in the second external queue memory, although at any one time only one of the tail pointers and one of the head pointers will be active. Such an implementation also includes a first internal wrap pointer that signifies a transition from the internal queue memory to the first external queue memory, a second internal wrap pointer that signifies a transition from the internal queue memory to the second external queue memory, a first external wrap pointer that signifies a transition from the first external queue memory back to the internal queue memory, and a second external wrap pointer that signifies a transition from the second external queue memory back to the internal queue memory. Depending on the occupancy of the three queue memories and the relative locations of the head pointer and the tail pointer, various combinations of the wrap pointers may be active at any one time.

The two external queue memories may be sized so that under normal circumstances, a situation will not arise in which occupancy of the internal queue memory reaches the first threshold and neither of the external queue memories is empty. However, in a variant of the two-external-queue-memory implementation, if neither of the external queue memories is empty when occupancy of the internal queue memory reaches the first threshold, more complex queue management can be used. For example, the tail pointer could transition from the internal queue memory to the location of the external wrap pointer in the least-recently-used one of the external queue memories. In this context, "least-recently-used" refers to use for writing but not for reading, and therefore the least-recently-used one of the external queue memories is also the one of the external queue memories in which the head pointer is currently active.

Alternatively, in a further implementation, more than two external queue memories could be provided to address the possibility that two external queue memories may be occupied at the same time.

As noted above, there are various considerations in setting the first threshold (at which the internal queue memory is considered too full to write to further) and the second threshold (at which the internal queue memory is considered empty enough to begin to write to again). As to the first threshold, although the first threshold could be set at something less than 100% occupancy, there is little reason not to use all available space in the internal queue memory as it fills up. As to the second threshold, the considerations are more nuanced, but in some implementations, avoiding continual bouncing between queue memories is considered more significant than obtaining the benefit of the faster, closer internal queue memory. Therefore, in one implementation, the first threshold is set to 100% and the second threshold is set to 0%. If such an implementation is used with two external queue memories, the pointers may operate according to the following rules, in which the head and tail pointers may be referred to as the read and write pointers, respectively, the first external queue memory may be referred to as "external queue 0," and the second external queue memory may be referred to as "external queue 1":

Writing - First Threshold: 100%; Second Threshold: 0%

0. Continually monitor internal queue memory occupancy
1. When the write pointer is in the internal queue memory, then write to the address of the write pointer.
   Otherwise, if the write pointer is in the first external queue memory, then write to the address of the write pointer based on its offset from the first external queue base address.

| Writing - First Threshold: 100%; Second Threshold: 0% |
|---|
| Otherwise, if the write pointer is in the second external queue memory, then write to the address of the write pointer based on its offset from the second external queue base address. |
| 2. When the write pointer is in the internal queue memory, increment the internal queue fill level by 1 to reflect the data just written.<br>If the new internal queue fill level is equal to the internal queue length, then the next write should be to one of the external queues. Therefore:<br>If the read pointer is currently in the first external queue, then writing should be to the second external queue because the first external queue is not empty. The write pointer location is set to the second external queue, and an internal queue wrap pointer is set to the position of the tail pointer in the second external queue;<br>Otherwise the read pointer must be in the second external queue, so the write pointer should be transferred to the first external queue, the write pointer location is set to the second external queue, and an internal queue wrap pointer is set to the position of the write pointer in the first external queue.<br>In either case, the location of the write pointer in the respective external queue is set to '0' -- i.e., the beginning of the queue.<br>Otherwise, if the new internal queue fill level is not equal to the internal queue length, the write pointer location is incremented by '1', modulo the internal queue length (meaning that the pointer wraps from the end of the queue to the beginning). |
| 3. If the write pointer is not in the internal queue memory, meaning that the write pointer is in one of the external queue memories because at some time in the past the internal queue memory had become full, then if the internal queue fill level (which is being monitored constantly) becomes '0' as a result of data just read, then the write pointer should return to the internal queue memory and:<br>If the write pointer location is in the first external queue, the write pointer location is set to the internal queue, and a first external queue wrap pointer is set to the position of the write pointer in the internal queue; and<br>If the write pointer location is in the second external queue, the write pointer location is set to the internal queue, and a second external queue wrap pointer is set to the position of the write pointer in the internal queue. |
| 4. If the internal queue has not become full as a result of the data just written, or empty as a result of data just read, then the write pointer location is unchanged and the write pointer position is incremented by '1' (modulo the internal queue length if the location is the internal queue). |

| Reading - First Threshold: 100%; Second Threshold: 0% |
|---|
| 0. Continually monitor internal queue memory occupancy |
| 1. When the read pointer is in the internal queue memory, then read from the address of the read pointer.<br>Otherwise, if the read pointer is in the first external queue memory, then read from the address of the read pointer based on its offset from the first external queue base address.<br>Otherwise, if the read pointer is in the second external queue memory, then read from the address of the read pointer based on its offset from the second external queue base address. |
| 2. When the read pointer is in the internal queue memory, decrement the internal queue fill level by 1 to reflect the data just read.<br>If the read pointer has advanced, after the previous read operation, to an internal wrapping point, then:<br>If the internal wrap pointer points to the first |

| Reading - First Threshold: 100%; Second Threshold: 0% |
|---|
| external queue, and the read pointer location is set to the first external queue; otherwise the internal wrap pointer must point to the second external queue, and the read pointer location is set to the second external queue. Either way, the read pointer position in its new location is set to '0'.<br>The internal wrap pointer is erased.<br>Otherwise, if the read pointer has not advanced, after the previous read operation, to an internal wrapping point, the read pointer location is incremented by '1', modulo the internal queue length (meaning that the pointer wraps from the end of queue to the beginning beginning). |
| 3. If the read pointer is not in the internal queue memory, but instead is in the first external queue memory:<br>If the read pointer has reached the first external wrap pointer, then the read pointer location is set to the internal queue, and the read pointer position is set to '0' -- i.e., the beginning of the queue -- and the first external wrap pointer is erased; and<br>If the read pointer has not reached the first external wrap pointer, then the read pointer location is incremented by '1' (the first external queue memory is of theoretically infinite length). |
| 4. If the read pointer is not in the internal queue memory or the first external queue memory, but instead is in the second external queue memory:<br>If the read pointer has reached the second external wrap pointer, then the read pointer location is set to the internal queue, and the read pointer position is set to '0' -- i.e., the beginning of the queue -- and the second external wrap pointer is erased; and<br>If the read pointer has not reached the second external wrap pointer, then the read pointer location is incremented by '1' (the second external queue memory is of theoretically infinite length). |

Figure 1:
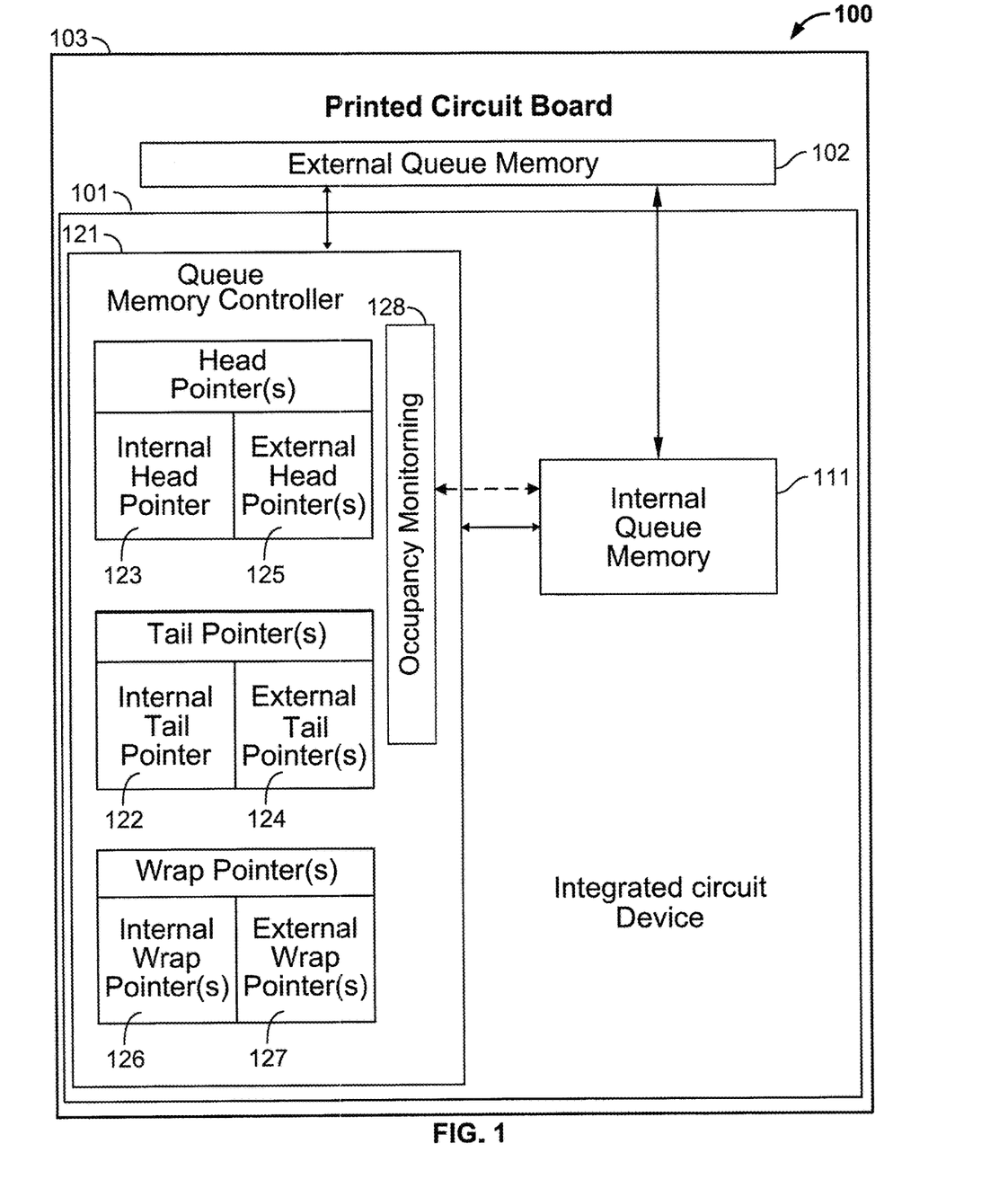
FIG. 1 is a schematic representation of memory queue apparatus according to implementations of the subject matter of this disclosure.

Memory queue apparatus 100 according to implementations of the subject matter of this disclosure, for use with an integrated circuit device, is shown in FIG. 1. Integrated circuit device 101 includes an internal queue memory 111. At least one external queue memory 102 is located outside integrated circuit device 101—e.g., on printed circuit board 103 on which integrated circuit device 101 also may be mounted. Integrated circuit device 101 also includes a queue memory controller 121, including occupancy monitoring circuitry 128 configured to monitor the occupancy level of internal queue memory 111. Queue memory controller 121 is configured to, based on that occupancy level, control the internal and external tail (write) pointers and head (read) pointers in accordance with the rules described above and the examples below. Internal tail pointer 122, internal head pointer 123, external tail pointer(s) 124, external head pointer(s) 125, internal wrap pointer(s) 126 and external wrap pointer(s) 127 may be implemented as circuitry, or as software or firmware executing on queue memory controller 121.

Figure 2:
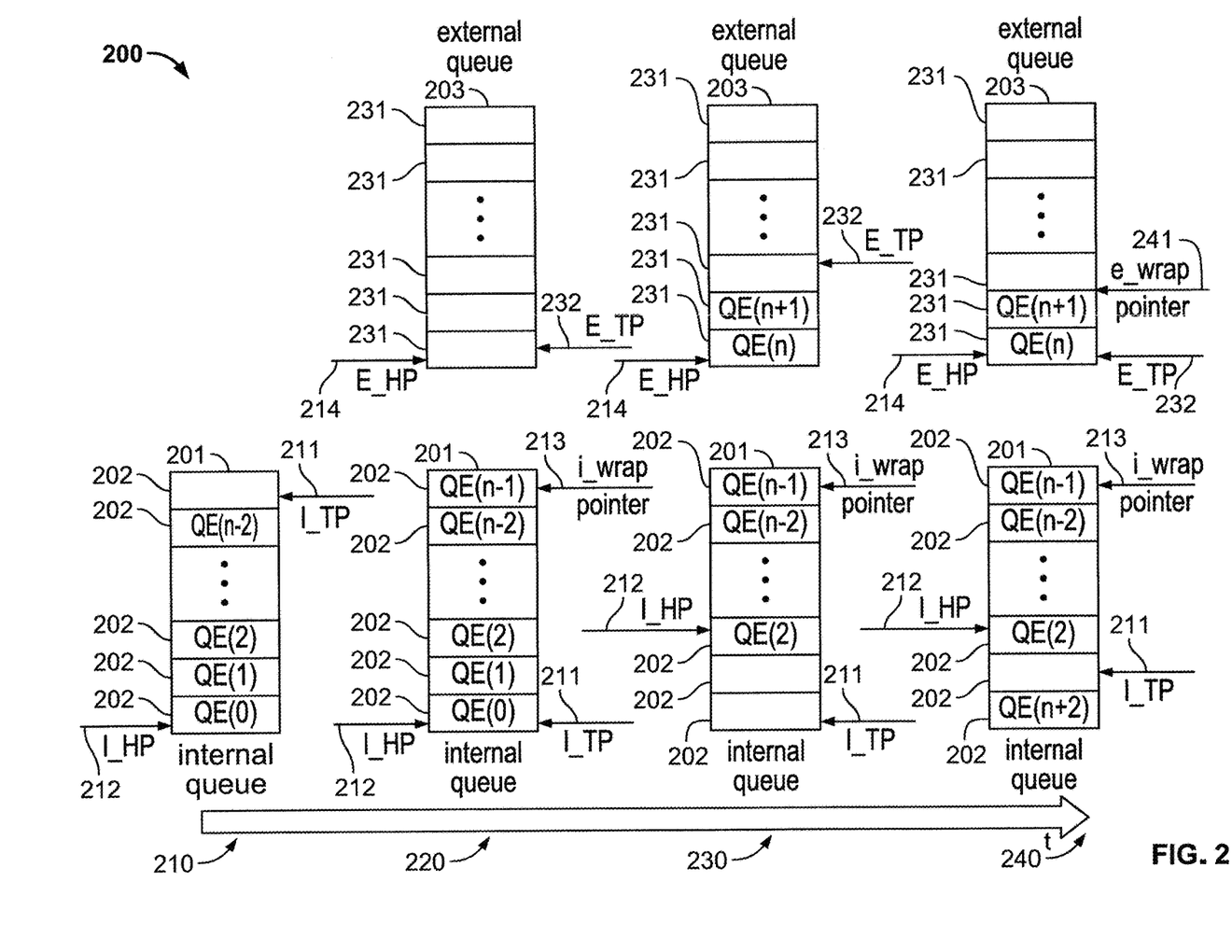
FIG. 2 is an example of a memory queue apparatus according to an implementation of this disclosure, having an internal queue memory and a single external queue memory.

FIG. 2 shows an example of the operation of a memory queue apparatus 200 according to an implementation of this disclosure, having an internal queue memory 201 having n memory locations 202, and a single external queue memory 203. Successive states of operation are shown along the t-axis. In state 210, n−1 of the n memory locations 202 are filled with data (queue elements QE(0) through QE(n−2)). Internal tail pointer 211 is pointing to the nth memory location 202 awaiting QE(n−1). None of the data has been read, so internal head pointer 212 points to QE(0).

In state 220, QE(n−1) has been written to the nth memory location 202, but still no data has been read. Internal tail pointer 211 has wrapped back to position 0, but because internal queue memory 201 remains full, external queue memory 203 has been activated. Internal wrap pointer 213 indicates to internal head pointer 212 to move to external queue memory 203 once internal wrap pointer 213 is reached. In this state 220, no data has yet been written to external queue memory 203, so that external tail pointer 232 points to the first position 231.

In state 230, two queue elements QE(n) and QE(n+1) have been written to two positions 231 of external queue memory 203, so that external tail pointer 232 points to the third position 231. Subsequently, elements QE(0) and QE(1) have been read, so that internal head pointer 212 now points to QE(2), with the first two positions 231 ready to accept new data (in this implementation, the second threshold is relatively high). None of the data in external queue memory 203 has been read, so external head pointer 214 points to the first position 231, occupied by queue element QE(n).

In state 240, external wrap pointer 241 (which when reached by external head pointer 214 will indicate that the head pointer should return to the internal queue memory 201) has been set and the tail pointer has been transferred back to internal tail pointer 211. An additional data element QE(n+2) has been written to first position 202 of internal queue memory 201. Internal tail pointer 211 has been advanced to second position 202 of internal queue memory 201. No additional data has been read from internal queue memory 201, so that internal head pointer 212 still points to QE(2). External tail pointer 232 has been returned to the beginning of external queue memory 203 because, although data remains to be read from external queue memory 203, the next time data is written to external queue memory 203, it will be written to the first position 231.

In state 240, if no further data is read, only one additional data element can be written into internal queue memory 201 before internal queue memory 201 is full again. Without more complex pointer management, it would be difficult to accept any data after that one additional queue element.

Figure 3A:
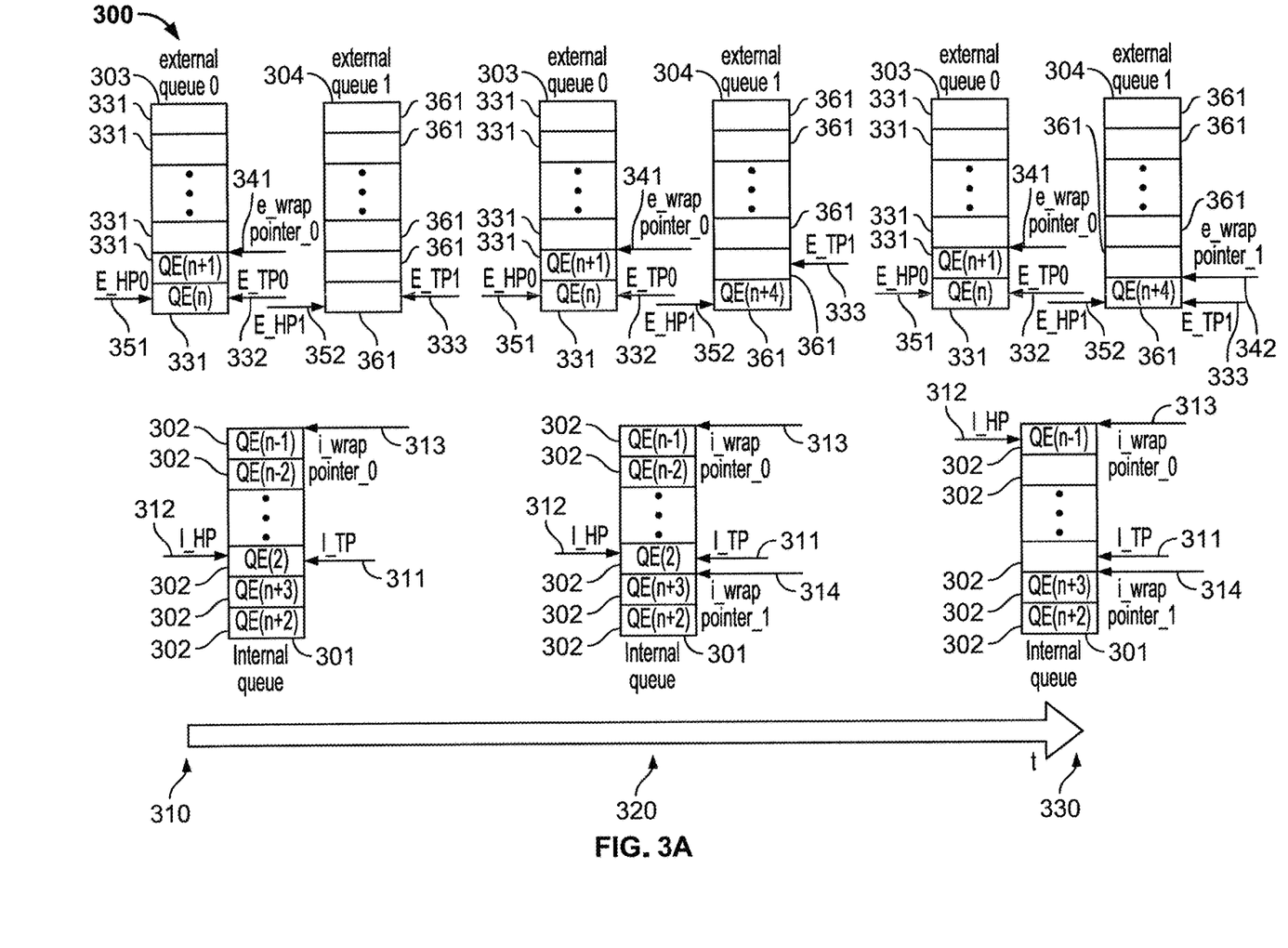
FIGS. 3A and 3B (hereinafter referred to collectively as FIG. 3) show an example of a memory queue apparatus according to an implementation of this disclosure, having an internal queue memory and two external queue memories.
Figure 3B:
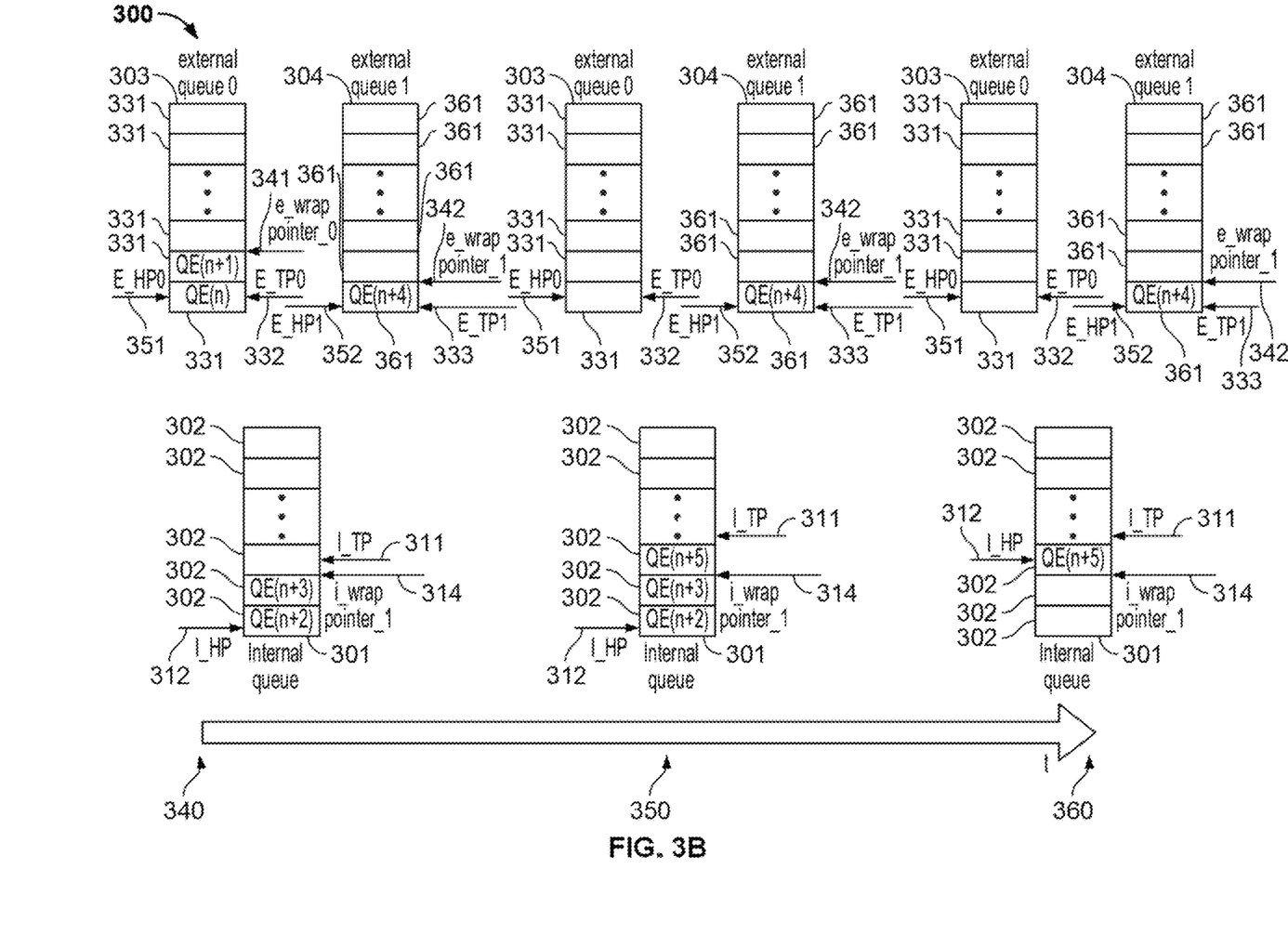

Therefore, memory queue apparatus 300 according to a further implementation of this disclosure, whose operation is shown in FIG. 3 (successive states of operation are shown along the t-axis), has an internal queue memory 301 having n memory locations 302, and two external queue memories 303, 304, having memory locations 331, 361, respectively.

In state 310, apparatus 300 has been operating through states similar to states 210-240 of apparatus 200, except that element QE(n+3) has been written to the only empty memory position in internal queue memory 201 of state 240. However, in this implementation, internal wrap pointer 213 is replaced by first internal wrap pointer 313, and a second internal wrap pointer 314, initially corresponding to the location of internal tail pointer 311 (see state 320), marks the transfer point to second external queue memory 304 (and the point to which the tail pointer will be transferred back to internal queue memory 301 when the occupancy falls below the second threshold). Similarly, external wrap pointer 241 has been replaced by first external wrap pointer 341, and external tail pointer 232 has been replaced by first external tail pointer 332.

In state 320, element QE(n+4) has been written to second external queue memory 304, and second external tail pointer 333 now points to the second position of second external queue memory 304. By state 330, no further data has been written to memory queue apparatus 300, but elements QE(2) through QE(n-2) have been read out, leaving internal queue memory 301 ready to accept data again. Therefore, second external wrap pointer 342 has been set at the former location of second external tail pointer 333, which has been moved back to the beginning of second external queue memory 304 to await the next time data is written to second external queue memory 304.

In state 340, element QE(n-1) has been read out and no further data has been written. No reading from external queue memory 303 has yet occurred, so first external head pointer 351 remains at the beginning of external queue memory 303. In state 350, elements QE(n) and QE(n+1) have been read out of first external queue memory 303, and an element QE(n+5) has been written to internal queue memory 301. Internal tail pointer 311 has been moved away from the location it shared with second internal wrap pointer 314. Second internal wrap pointer 314 continues to indicate where the head pointer should return from second external queue memory 304, while internal tail pointer 311, in its new location, indicates where the next data element should be written to internal queue memory 301. The head pointer has transferred from first external head pointer 351 (see state 340) to internal head pointer 312, identifying elements QE(n+2) and QE(n+3) as the next to be read. At an unseen time between state 340 and state 350, first external head pointer 351 will have moved from the first position 331 of first external queue memory 303 to the second position 331 of first external queue memory 303 after element QE(n) was read out. After element QE(n+1) was read out, first external head pointer 351 returned to the first position 331 of first external queue memory 303, and first external wrap pointer 341 was erased.

By state 360, elements QE(n+2) and QE(n+3) have been read, and the head pointer has transferred from internal head pointer 312 to second external head pointer 352, identifying element QE(n+4) the next to be read. When element QE(n+4) has been read (not shown), the head pointer will follow second external wrap pointer 342 back to second internal wrap pointer 314, reactivating internal head pointer 312.

Figure 4:
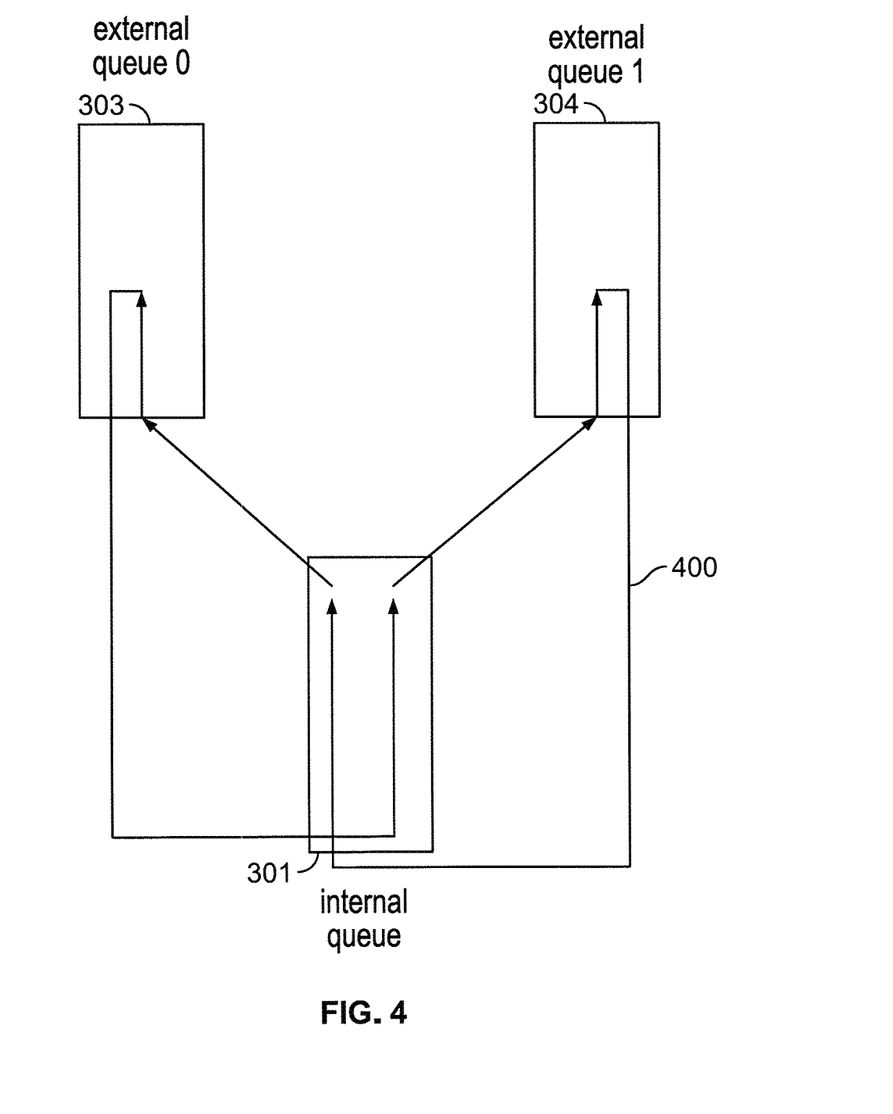
FIG. 4 is a representation of a data flow among the internal and external queue memories of FIG. 3.

Rules such as those set forth above provide orderly transitions among the internal queue memory and the external queue memories, without continual bouncing back and forth between the internal queue memory and one or the other of the external queue memories. As long as writing to the queue does not happen so much faster than reading from the queue that both external queues are occupied when the internal queue becomes full, the rules set forth above will result in the tail pointer, followed by the head pointer, traversing the path 400 shown in FIG. 4 among the internal queue memory and the two external queue memories. The same principles can be extended to any number of external queue memories. Moreover, because the individual queue memories could be implemented as a portions or partitions of a single larger external queue memory, an implementation with more than two external queue memories also could be considered as an implementation having two external queue memories with more complex pointer management.

Thus it is seen that an extendable hardware queue having an internal queue memory and at least one external queue memory has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of operating a hardware queue for an integrated circuit device, wherein the hardware queue includes an internal queue memory onboard the integrated circuit device and having a number of storage locations, and at least one external queue memory outside the integrated circuit device, the method comprising:

monitoring occupancy of the internal queue memory; and responsive to occupancy of the internal queue memory, controlling:

(a) an internal tail pointer indicating a next write point for inserting new data into the internal queue memory, (b) an internal head pointer indicating a next read point for extracting data from the internal queue memory based on order of insertion, (c) at least one external tail pointer indicating a next write point for inserting new data into the external queue memory, (d) at least one external head pointer indicating a next read point for extracting data from the external queue memory based on order of insertion, and (e) wrap pointers indicating a transition from the internal queue memory to the external queue memory based on occupancy of the internal queue memory exceeding a first threshold, and a transition from the external queue memory to the internal queue memory based on occupancy of the internal queue memory falling below a second threshold, to operate the internal queue memory and the external queue memory as a continuous hardware queue memory.

2. The method of claim 1, wherein the controlling comprises:

maintaining the internal tail pointer indicating a next write point for inserting new data into the internal queue memory, the internal tail pointer advancing through the internal queue memory;

maintaining the internal head pointer indicating a next read point for extracting data from the internal queue memory based on order of insertion, the internal head pointer advancing through the internal queue memory;

when the internal tail pointer is active at a first storage location in the internal queue memory and the occupancy of the internal queue memory exceeds the first threshold:

setting a first internal wrap pointer at the first storage location in the internal queue memory to communicate to the internal head pointer to point to the at least one external queue memory upon reaching the first storage location, and activating a first external tail pointer in the at least one external queue memory; and when the first external tail pointer is active at a second storage location in the at least one external queue memory, and the occupancy of the internal queue memory falls to or below the second threshold:

setting a first external wrap pointer at the second storage location in the external queue memory to communicate to a first external head pointer to point to the internal wrap pointer in the internal queue memory upon reaching the second storage location, and activating the internal tail pointer at the first storage location.

3. The method of claim 2 wherein the monitoring the occupancy of the internal queue memory comprises continually monitoring the occupancy of the internal queue memory.

4. The method of claim 2 wherein the second threshold, at which the setting the first external wrap pointer and the activating the internal tail pointer are performed, is equal to the first threshold, at which the setting the first internal wrap pointer and the activating the first external tail pointer are performed.

5. The method of claim 2 wherein the second threshold, at which the setting the first external wrap pointer and the activating the internal tail pointer are performed, is less than the first threshold, at which the setting the first internal wrap pointer and the activating the first external tail pointer are performed are performed.

6. The method of claim 2 wherein the first threshold, at which the setting the first internal wrap pointer and the activating the first external tail pointer are performed, is 100% occupancy.

7. The method of claim 2 wherein the second threshold, at which the setting the first external wrap pointer and the activating the internal tail pointer are performed, is 0% occupancy.

8. The method of claim 2 wherein, when the at least one external queue memory outside the integrated circuit device comprises a first external queue memory and a second external queue memory, the activating a first external tail pointer in the at least one external queue memory comprises:

determining that one of the first external queue memory and the second external queue memory is empty; and activating the first external wrap pointer in the one of the first external queue memory and the second external queue memory that is empty.

9. The method of claim 8 further comprising, when one of the first and second external queue memories was not empty:

maintaining a second external wrap pointer in the one of the first and second external queue memories that was not empty;

maintaining a second internal wrap pointer at a position, in the internal queue memory, where the first internal tail pointer was located when data had previously begun to be written to the one of the first and second external queue memories that was not empty; and when reading from the one of the first and second external queue memories that was not empty, returning the internal head pointer to the position, in the internal queue memory, of the second internal wrap pointer.

10. The method of claim 2 further comprising:

after activating the internal tail pointer at the first storage location in the internal queue memory, advancing the internal tail pointer through the internal queue memory while maintaining the internal wrap pointer at the first storage location at least until a read position returns, from the at least one external queue memory, to the internal head pointer at the first storage location.

11. The method of claim 10 further comprising:

continuing to advance the external head pointer in the at least one external queue memory as data is read, until the external head pointer reaches the first external wrap pointer; and upon the external head pointer reaching the first external wrap pointer, returning the read position to the internal head pointer at the first storage location in the internal queue memory as indicated by the first internal wrap pointer.

12. The method of claim 2 further comprising, after writing data at the next write point indicated by the internal tail pointer, advancing the internal tail pointer by one storage location in the internal queue memory, wherein advancing one storage location from a last storage location in the internal queue memory comprises advancing to a first storage location in the internal queue memory.

13. Memory queue apparatus, comprising:
an integrated circuit device;
a hardware queue including an internal queue memory onboard the integrated circuit device and having a number of storage locations, and at least one external queue memory outside the integrated circuit device; and
a queue memory controller configured to:
monitor occupancy of the internal queue memory, and
responsive to occupancy of the internal queue memory, control:
(a) an internal tail pointer indicating a next write point for inserting new data into the internal queue memory,
(b) an internal head pointer indicating a next read point for extracting data from the internal queue memory based on order of insertion,
(c) at least one external tail pointer indicating a next write point for inserting new data into the external queue memory,
(d) at least one external head pointer indicating a next read point for extracting data from the external queue memory based on order of insertion, and
(e) wrap pointers indicating a transition from the internal queue memory to the external queue memory based on occupancy of the internal queue memory exceeding a first threshold, and a transition from the external queue memory to the internal queue memory based on occupancy of the internal queue memory falling below a second threshold,
to operate the internal queue memory and the external queue memory as a continuous hardware queue memory.

14. The memory queue apparatus of claim 13, wherein the queue memory controller is configured to:
maintain the internal tail pointer indicating a next write point for inserting new data into the internal queue memory;
maintain the internal head pointer indicating a next read point for extracting data from the internal queue memory based on order of insertion;
when the internal tail pointer is active at a first storage location in the internal queue memory and the occupancy of the internal queue memory exceeds the first threshold:
set a first internal wrap pointer at the first storage location in the internal queue memory to communicate to the internal head pointer to point to the at least one external queue memory upon reaching the first storage location, and
activate a first external tail pointer in the at least one external queue memory; and
when the first external tail pointer is active at a second storage location in the at least one external queue memory, and the occupancy of the internal queue memory falls to or below the second threshold:
set a first external wrap pointer at the second storage location in the external queue memory to communicate to a first external head pointer to point to the internal wrap pointer in the internal queue memory upon reaching the second storage location, and
activate the internal tail pointer at the first storage location.

15. The memory queue apparatus of claim 14 wherein the controller continually monitors the occupancy of the internal queue memory.

16. The memory queue apparatus of claim 14 wherein the second threshold, at which the queue memory controller is configured to set the first external wrap pointer and activating the internal tail pointer, is equal to the first threshold, at which the queue memory controller is configured to set the first internal wrap pointer and activate the first external tail pointer.

17. The memory queue apparatus of claim 14 wherein the second threshold, at which the queue memory controller is configured to set the first external wrap pointer and activate the internal tail pointer, is less than the first threshold, at which the queue memory controller is configured to set the first internal wrap pointer and activate the first external tail pointer.

18. The memory queue apparatus of claim 14 wherein the first threshold, at which the queue memory controller is configured to set the first internal wrap pointer and activate the first external tail pointer, is 100% occupancy.

19. The memory queue apparatus of claim 14 wherein the second threshold, at which the queue memory controller is configured to set the first external wrap pointer and activate the internal tail pointer is 0% occupancy.

20. The memory queue apparatus of claim 14 wherein, when the at least one external queue memory outside the integrated circuit device comprises a first external queue memory and a second external queue memory, the queue memory controller activates a first external tail pointer in the at least one external queue memory by:
determining that one of the first external queue memory and the second external queue memory is empty; and
activating the first external wrap pointer in the one of the first external queue memory and the second external queue memory that is empty.

21. The memory queue apparatus of claim 20 wherein, when one of the first and second external queue memories was not empty, the queue memory controller:
maintains a second external wrap pointer in the one of the first and second external queue memories that was not empty;
maintains a second internal wrap pointer at a position, in the internal queue memory, where the first internal tail pointer was located when data had previously begun to be written to the one of the first and second external queue memories that was not empty; and
when reading from the one of the first and second external queue memories that was not empty, returns the internal head pointer to the position, in the internal queue memory, of the second internal wrap pointer.

22. The memory queue apparatus of claim 14 wherein, after activating the internal tail pointer at the first storage location in the internal queue memory, the queue memory controller:
advances the internal tail pointer through the internal queue memory while maintaining the internal wrap pointer at the first storage location at least until a read position returns, from the at least one external queue memory, to the internal head pointer at the first storage location.

23. The memory queue apparatus of claim 22 wherein the queue memory controller:
continues to advance the first external head pointer in the at least one external queue memory as data is read, until the first external head pointer reaches the first external wrap pointer; and
upon the first external head pointer reaching the first external wrap pointer, returns the read position to the internal head pointer at the first storage location in the internal queue memory as indicated by the first internal wrap pointer.

24. The memory queue apparatus of claim 14 wherein, after writing data at the next write point indicated by the internal tail pointer, the queue memory controller advances the internal tail pointer by one storage location in the internal queue memory, wherein advancing one storage location from a last storage location in the internal queue memory comprises advancing to a first storage location in the internal queue memory.

\* \* \* \* \*